(12) United States Patent
Szapiel et al.

(10) Patent No.: US 8,379,321 B2
(45) Date of Patent: Feb. 19, 2013

(54) METHOD AND APPARATUS FOR ACCURATE IMAGING WITH AN EXTENDED DEPTH OF FIELD

(75) Inventors: Stanislaw Szapiel, Port McNicoll (CA); Catherine A. Greenhalgh, Midland (CA); Donald J. Denis, Barrie (CA)

(73) Assignee: Raytheon Canada Limited, Ottawa, Ontario (CA)

( * ) Notice: Subject to any disclaimer, the term of this patent is extended or adjusted under 35 U.S.C. 154(b) by 1021 days.

(21) Appl. No.: 12/398,600

(22) Filed: Mar. 5, 2009

(65) Prior Publication Data

US 2010/0226011 A1 Sep. 9, 2010

(51) Int. Cl.
*G02B 13/20* (2006.01)
(52) U.S. Cl. ...................................... 359/707
(58) Field of Classification Search .................. 359/707, 359/708; 382/279
See application file for complete search history.

(56) References Cited

U.S. PATENT DOCUMENTS

| | | | |
|---|---|---|---|
| 4,965,441 A | 10/1990 | Picard | |
| 5,748,371 A | 5/1998 | Cathey, Jr. et al. | |
| 6,097,856 A | 8/2000 | Hammond, Jr. | |
| 6,842,297 B2 | 1/2005 | Dowski, Jr. | |
| 6,927,922 B2 | 8/2005 | George et al. | |
| 7,106,511 B2 | 9/2006 | Grot et al. | |
| 7,224,540 B2 | 5/2007 | Olmstead et al. | |
| 2006/0050409 A1 | 3/2006 | George et al. | |
| 2006/0171041 A1 | 8/2006 | Olmstead et al. | |
| 2008/0158377 A1 | 7/2008 | Chanas et al. | |
| 2009/0316995 A1* | 12/2009 | Szeliski et al. | 382/199 |
| 2011/0026909 A1* | 2/2011 | Liege et al. | 396/63 |

OTHER PUBLICATIONS

PCT Search Report (PCT/ISA/220 and 210) and Written Opinion (PCT/ISA/237) dated Jun. 17, 2010 for PCT Application No. PCT/US2010/026389, 13 pages.
"Novel Optical Systems Design and Optimization XI", Proceedings of SPIE, vol. 7061, San Diego, California, Aug. 10-14, 2008, 11 pages.

* cited by examiner

*Primary Examiner* — Alessandro Amari
(74) *Attorney, Agent, or Firm* — Lando & Anastasi, LLP

(57) ABSTRACT

A method and apparatus involve using optics to direct radiation from a scene along an optical axis, the optics having a chromatic dispersion that is a function of a characteristic spectral signature for the scene so as to produce a chromatic blur that, for an extended depth-of-field region, is substantially spatially constant along the optical axis. A different method involves: identifying for a characteristic scene a spectral response curve; determining a plurality of different wavelength nodes dividing the area under the spectral response curve into a plurality of substantially equal segments; generating a mapping relationship that maps each of the wavelength nodes to a respective one of a plurality of focal points spaced substantially equally along the optical axis; and configuring the optical system as a function of the mapping relationship.

20 Claims, 8 Drawing Sheets

METHOD AND APPARATUS FOR ACCURATE IMAGING WITH AN EXTENDED DEPTH OF FIELD

FIELD OF THE INVENTION

This invention relates in general to imaging techniques and, more particularly, to imaging techniques that seek to provide an extended depth of field.

BACKGROUND

Conventional optical systems typically suffer from a limited depth of field in the object space, and a corresponding limited depth of focus in the image space. For example, these limitations exist in many electro-optical imaging systems, such as digital cameras, and forward looking infrared (FLIR) systems.

As one specific example, consider a pre-existing state-of-the-art FLIR imaging device with an uncooled detector array. All targets or other objects located in a range of typically about 70 m to infinity will be seen sharply, but anything closer to the imager will be blurred in images from the detector array. If an object suddenly appears at a distance of, for example, 15 m from the imager, it can be difficult or impossible to identify or even recognize the target. It is possible to attempt to refocus the imager, but this requires time and involves moving parts. More importantly, attempting to refocus the imager in this manner will cause distant objects (for example from 50 m to infinity) to be blurred in images, so much so that it will be very difficult to recognize and/or correctly identify those distant objects.

It would be desirable to have an imager that can produce crisp thermal images of multiple objects simultaneously appearing at different distances from 5 m to infinity. However, as a practical matter, it is not a straightforward task to achieve such large depth of field in a conventional portable imager having an uncooled detector. Theoretically, one possible approach would be stopping down the optics. However, this always involves a significant loss of light, which is problematic in thermal imagers with uncooled detectors (because such detectors require very fast optics to operate properly). In addition, stopping down optics will also involve a loss of resolution (at least in well-corrected optics).

A different approach would be to carry out step-by-step focusing, while recording a separate image at each step, and then fuse the multiple recorded images. However, this is a complex and expensive solution that requires moving parts, and that is relatively slow. In addition, during the image fusing process, sharp images of any given object will overlap with unsharp images of that same object taken at other focal steps, which may reduce contrast, and which may necessitate sophisticated and lengthy image-processing routines. Although pre-existing techniques of the type discussed above have been generally adequate for their intended purpose, they have not been satisfactory in all respects.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
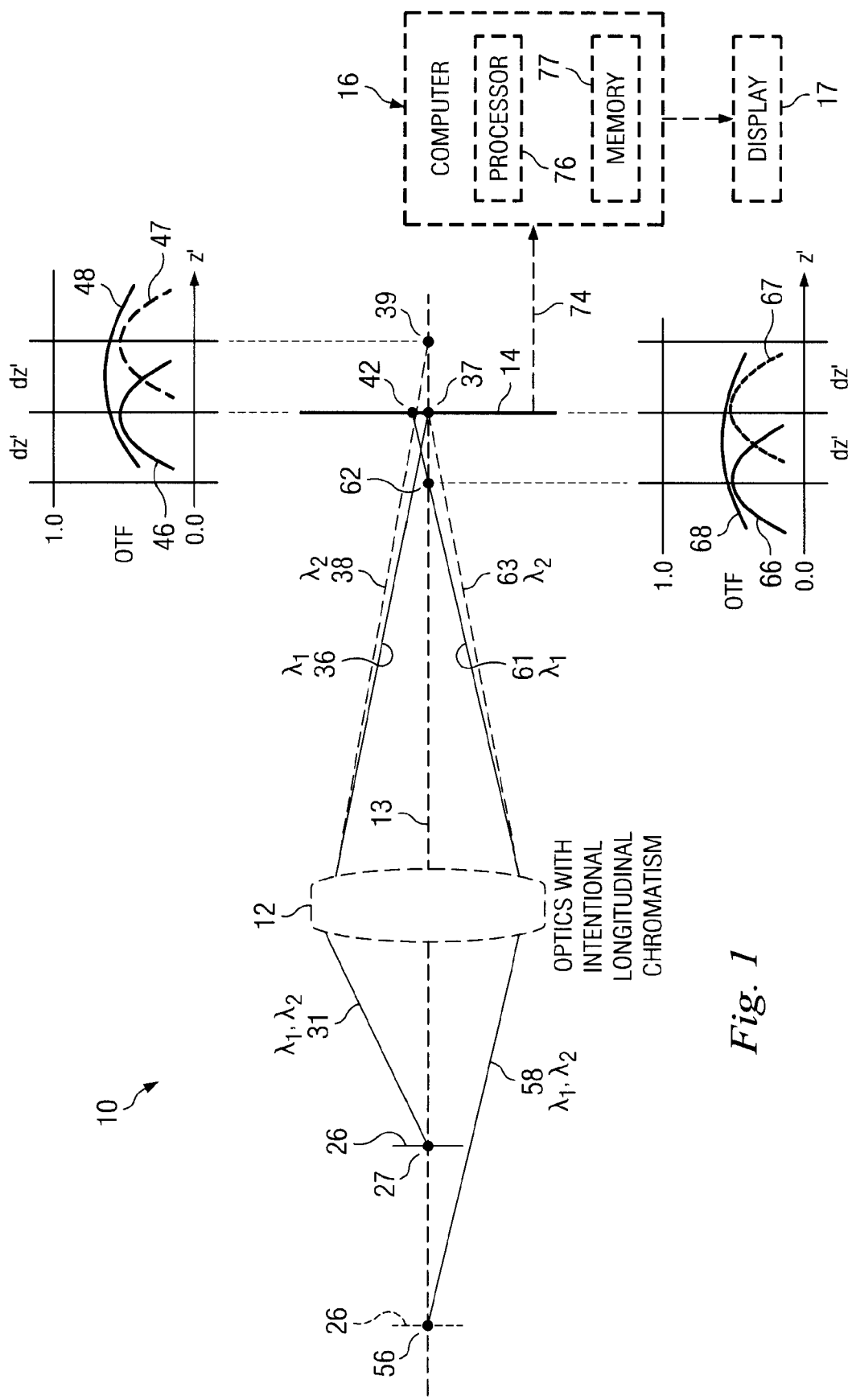
FIG. 1 is a diagrammatic view of an apparatus that embodies aspects of the invention, and that includes optics, an image detector, a computer, and a display.

FIG. 1 is a diagrammatic view of an apparatus 10 that includes optics 12 with an optical axis 13, an image detector 14, a computer 16, and a display 17. The apparatus 10 of FIG. 1 happens to be configured for an operating range involving long wave infrared (LWIR) radiation, but it could alternatively be configured to operate in some other range of the electromagnetic spectrum.

An exemplary implementation of the optics 12 will be described in more detail later. For purposes of FIG. 1, the optics 12 are shown diagrammatically. Assume that a scene contains a target or object 26 that is disposed at a location 27 along the optical axis 13. Also, for simplicity, assume initially that the object 26 has a spectral signature with only two monochromatic spectral lines. Stated differently, assume that radiation emitted, reflected or transmitted by the object 27 contains only two wavelengths $\lambda_1$ and $\lambda_2$ that, in effect, represent different colors. For clarity in the discussion that follows, FIG. 1 uses a single ray to represent each beam of radiation. Thus, for example, a single ray 31 is used to represent the radiation emitted, reflected or transmitted by the object 26 when it is at the location 27.

The optics 12 are configured to intentionally introduce longitudinal chromatism into radiation passing therethrough. The apparatus 10 in FIG. 1 is assumed to be optically perfect, except for the intentional longitudinal chromatism introduced by the optics 12, such that a collimated beam of light composed of different wavelengths and passing through the optics 12 will focus into perfect but separate focal points along the optical axis. Thus, for example, the two different wavelengths $\lambda_1$ and $\lambda_2$ in the radiation 31 are refracted differently by the optics 12, and the radiation 36 at wavelength $\lambda_1$ converges at a focal point 37 on the optical axis, whereas the radiation 38 at wavelength $\lambda_2$ converges at a different focal point 39 on the optical axis.

For simplicity in this explanation, and without losing generality, the image detector 14 has been positioned along the optical axis 13 at the focal point 37 for the radiation 36 at wavelength $\lambda_1$. The illustrated ray of radiation 38 at wavelength $\lambda_2$ impinges on the image detector 14 at a point 42 that is offset from the focal point 37. In other words, when the object 26 is at location 27, radiation at wavelength $\lambda_1$ will be sharply focused on the image detector 14, whereas radiation at wavelength $\lambda_2$ will have some intentional blur at the detector 14. The upper portion of FIG. 1 includes a graph corresponding to the situation where the object 26 is at location 27, and depicts the monochromatic through-focus optical transfer function (OTF) 46 for wavelength $\lambda_1$, the monochromatic through-focus OTF 47 for wavelength $\lambda_2$, and also the polychromatic through-focus OTF 48 for wavelengths $\lambda_1$ and $\lambda_2$, where curve 48 is the sum of curves 46 and 47.

Assume now that the object 26 is moved away from the optics 12, from location 27 to a different location 56. Reference numeral 58 represents one ray of polychromatic radiation from the object 26 at location 56, including wavelengths $\lambda_1$ and $\lambda_2$. The optics 12 introduce intentional longitudinal chromatism, such that monochromatic radiation 61 at wavelength $\lambda_1$ has a focal point 62, and impinges on the image detector 14 at the point 42 that is offset from the optical axis 13. Reference numeral 61 represents a monochromatic ray of radiation at wavelength $\lambda_1$ that intercepts the optical axis 13 at a focal point 62, and impinges on the image detector at the point 42 offset from the optical axis. Reference numeral 63 represents a monochromatic ray of radiation at wavelength $\lambda_2$ that intercepts the optical axis 13 at the focal point 37.

For simplicity, and without losing generality, the location 56 of the object 26 has been selected in FIG. 1 so that the radiation 63 at wavelength $\lambda_2$ converges to the focal point 37 at the image detector 14. Thus, when the object 26 is at location 56, radiation at wavelength $\lambda_2$ is sharply focused on the image detector 14, whereas radiation at wavelength $\lambda_1$ has an intentional degree of blur at the image detector 14. The lower portion of FIG. 1 includes a graph corresponding to the situation where the object 26 is at location 56, and depicts the monochromatic through-focus optical transfer function (OTF) 66 for wavelength $\lambda_1$, the monochromatic through-focus OTF 67 for wavelength $\lambda_2$, and also the polychromatic through-focus OTF 68 for wavelengths $\lambda_1$ and $\lambda_2$, where curve 68 is the sum of curves 66 and 67.

In the embodiment of FIG. 1, the image detector 14 is a conventional device that is configured to detect LWIR radiation. In particular, the image detector 14 is an uncooled microbolometric array of 19,200 pixels (160×120 pixels), with a pixel pitch of 45 microns, a sampling frequency of 22 cycles/mm, and a Nyquist frequency of 11 cycles/mm. However, it would alternatively be possible to use any other suitable device as the image detector 14. The images detected by image detector 14 are supplied at 74 in electronic form to the computer 16. The hardware of the computer 16 is conventional, and includes a processor 76, and a memory 77. The memory 77 stores a computer program that is executed by the processor 76, and also stores static and dynamic data utilized by the computer program as it is executed.

If the object 26 happens to be at location 27, images received at 74 by the computer 16 from the image detector 14 will show the radiation at wavelength $\lambda_1$ in sharp focus, whereas the radiation at wavelength $\lambda_2$ will be blurred. The computer program executed by the processor 76 takes the image information received at 74, and applies a standard deconvolution algorithm (with a unique recovery kernel) that brings the blurred radiation at wavelength $\lambda_2$ into sharp focus, in order to produce a processed image in which the radiation at each of the wavelengths $\lambda_1$ and $\lambda_2$ is in sharp focus. This processed image is then supplied to and displayed on the conventional display 17. In this regard, and as discussed in more detail later, the optics 12 have a chromatic dispersion that is configured as a function of a characteristic spectral signature for the object 26, so as to produce a chromatic blur that, for an extended depth-of-field region, is substantially spatially constant along the optical axis 13. The overall system has a geometric optical transfer function (GOTF), and the computer program executed by the processor 76 carries out the standard deconvolution algorithm, using the reciprocal of the GOTF as a recovery kernel.

On the other hand, if the object 26 happens to be at location 56, then the images received at 74 by the computer 16 from the image detector 14 will show the radiation at wavelength $\lambda_2$ in sharp focus, whereas the radiation at wavelength $\lambda_1$ will be blurred. The computer program executed by the processor 76 takes the image information received at 74, and applies the standard deconvolution algorithm (with unique recovery kernel) that brings the blurred radiation at wavelength $\lambda_1$ into sharp focus, in order to produce a processed image in which the radiation at each of the wavelengths $\lambda_1$ and $\lambda_2$ is in sharp focus. This processed image is then supplied to and displayed on the conventional display 17.

If the superposition of the blurred radiation and focused radiation generates the same response of the image detector 14 for each of the positions 27 and 56 of the object 26, the system will register the image of the object with essentially the same blur. Since the blur as perceived by the image detector 14 is the same, the same deconvolving kernel can be used for both positions. In fact, if two identical or very similar objects were simultaneously located at the respective positions 27 and 56, blur could be simultaneously removed from each of their images in a single operation of inverse filtering, yielding a processed image that sharply depicts both objects.

In more detail, consider a one-dimensional optical system with a slit exit pupil having a total width of $2a$ and a working focal distance s' to the image detector, where the pixel pitch of the image detector is p. Assume that the spectral weighting coefficients for the overall arrangement (including spectral emission/reflection of light from the scene or object, spectral transmission through propagation media and optics, and spectral response of the image detector) are $c_1$ for $\lambda_1$ and $c_2$ for $\lambda_2$. In addition, assume standard normalization, so that $c_1+c_2=1$. Also assume that the longitudinal chromatism of the optics is such that the distance from the plane of the image detector to the focal point for wavelength $\lambda_2$ is dz'. The geometrical blur size at the detector will be dz'/N, where N is the effective f-number of the optics. This blur can be interpreted as the geometrical point spread function (PSF), so its Fourier transform (representing the corresponding monochromatic OTF response in geometric optics limit) is:

$$\sin c[(v'/N)(z'-dz')],$$

where v' is the spatial frequency in cycles/mm in detector space, and $\sin c(x)=\sin(B\ x)/(B\ x)$. At this point, it is convenient to introduce dimensionless variables for the spatial frequency and longitudinal defocus, as follows:

$$v=v'/v'_{nyq}$$

$$dz=dz'/[(2p)N],$$

where $v'_{nyq}=1/(2p)$ denotes the Nyquist frequency of the image detector, and p is the pixel pitch of the detector. Pursuant to the Nyquist theorem, in order to achieve proper sampling of the blur, only normalized frequencies v not greater than 1 and normalized focal shifts dz not smaller than 1 are of interest.

It should be clear that the polychromatic OTF response will be the same for both object positions if $c_1=c_2=\frac{1}{2}$, or in other words when the two spectral lines (representing wavelengths $\lambda_1$ and $\lambda_2$) both have the same strength, so that they produce the same detector response. If this is the case, then inverse filtering will deliver a sharp image of the object in either position (and a sharp image of two similar objects respectively in the two positions.

As mentioned above, deconvolution can be used to obtain an image with an extended depth of focus. Some of the theory underlying the use of deconvolution will now be briefly discussed. According to linear systems theory, as applied to optical imagery of extended objects in incoherent illumination, intensity distribution in the image $g(x',y')$ is a convolution of two functions. The first is intensity distribution in the magnified version of the object $o(x',y')$ and the second, representing intensity distribution in the image of a single point, is known as the incoherent point spread function $psf(x',y')$. Thus:

$$g(x',y')=o(x',y') \theta psf(x',y'), \qquad (1)$$

where $\theta$ denotes the operation of convolution (Faltung), and $(x',y')$ are Cartesian coordinates in the image plane. This assumes that the image plane is at location $z'$ along the optical axis.

In general, $psf(x',y')$ represents the degradations caused by the optical system, including the effect of blur due to diffraction and wavefront aberrations. If the system is perfect, then only diffraction will contribute to the shape of $psf(x',y')$. In the present discussion, the diffraction-limited version of the point spread function is denoted by $psf_o(x',y')$.

Two-dimensional convolution can involve complicated and lengthy two-dimensional integration over the area of the image. Through the use of a well-known convolution theorem for Fourier transforms, the above relationship can be equivalently expressed as a product of Fourier transforms of corresponding intensity functions. In particular, if $G(u',v')$, $O(u',v')$ and $OTF(u',v')$ are Fourier transforms of intensity distributions $g(x',y')$, $o(x',y')$ and $psf(x',y')$, the convolution is replaced simply by the product:

$$G(u',v')=O(u',v')*OTF(u',v'), \qquad (2)$$

where $(u',v')$ denotes spatial frequencies, and the Fourier transform of $psf(x',y')$ is the optical transfer function $OTF(u',v')$ of the optical system under study.

Equations (1) and (2) above are mathematically equivalent, but the spatial frequency domain approach represented by equation (2) is usually more convenient to use, and is therefore used in the discussion that follows. This approach is consistent with other components of the complete digital imaging system, such as the image detector, the electronics, and the display, which have their own transfer functions. Alternatively, however, it would be possible to address this in the image space domain represented by equation (1) above.

Deconvolution is a classic technique for recovering unblurred intensity distribution in a magnified object $o(x',y')$, provided that the intensity distribution in its blurred image $g(x',y')$ is acquired, and the cause and nature of the blur as represented by the point spread function $psf(x',y')$ of the optics is known. The deconvolution can equivalently be carried out in the spatial frequency domain, simply by solving equation (2) above for $O(u',v')$:

$$O(u',v')=G(u',v')X[1/OTF(u',v')], \qquad (3)$$

and then taking the inverse Fourier transform of this result in order to arrive at $O(x',y')$. This approach of performing deconvolution in the spatial frequency domain is often referred to as inverse filtering, and the reciprocal $$1/OTF(u',v')=K(u',v') \qquad (4)$$

is known as a recovery function or recovery kernel.

This known deconvolution approach (which attempts to recover a true object or target as described by the function $o(x',y')$), is not used here. A goal here is to restore a diffraction-limited version $g_0(x',y')$ of an image. Such an image could have been created only if the optics were aberrationless, such that the only source of image degradation taken into account is diffraction of light. As a practical matter, of course, purely diffraction-limited optics do not exist in the real world. Nevertheless, this approach is still more than adequate for many imaging applications and devices.

If the optics are perfect, or in other words truly diffraction limited, the optical transfer function of the optics can be expressed as $OTF_o(u',v')$. For convenience, it will be helpful to introduce the relative optical transfer function (ROTF):

$$ROTF(u',v')=OTF(u',v')/OTF_0(u',v'). \qquad (5)$$

For a diffraction-limited optics, $ROTF(u',v')=1.0$ for all spatial frequencies of interest. For practical reasons, consideration is given here only to spatial frequencies that are lower than the Nyquist spatial frequency of the detector array used for image acquisition. (The detector Nyquist frequency is half the detector spatial sampling frequency $1/p$, where p is the pixel pitch). In addition, spatial frequency bands are ignored where the image contrast drops to zero or below the noise floor, or where contrast reversals occur.

Since a goal here is to recover a diffraction-limited version of an image of an object or target, the usual inverse filtering approach is modified as follows, $$G_0(u',v')=G(u',v')\cdot[OTF_0(u',v')/OTF(u',v')]. \qquad (6)$$

So now the recovery function is the reciprocal of the relative transfer function, or in other words $1/ROTF(u',v')$. After applying an inverse Fourier transform to the above result, the diffraction-limited image $g_0(x',y')$ is finally restored.

In regard to establishing a recovery kernel $1/ROTF(u',v')$, consider the following heuristic approximation:

$$OTF(u',v')=OTF_0(u',v') \times GOTF(u',v'). \qquad (7)$$

Equation (7) indicates that the true value of the OTF, as calculated in a manner accounting for the combined effect of wavefront aberrations and diffraction, can be expressed as a product of two simpler terms. The first term is simply the corresponding diffraction-limited OTF, involving only diffraction, and no aberrations. The second term is a geometrical approximation of the optical transfer function (GOTF), involving ray aberrations only, and no diffraction.

The GOTF term can be easily found by performing a Fourier transform of the intensity distribution in the PSF, as predicted by using a geometrical ray pattern (or in other words by ignoring diffraction and interference effects between the rays, and taking into account only transverse ray aberrations). This greatly simplifies the calculations, by permitting quick numerical OTF calculations with an accuracy sufficient for the present situation, especially where optics have more than two waves of aberration. Here, this is used for analytic purposes, and in particular for quick and efficient design of optics that produce the appropriate blurred images. By comparing equations (6) and (7), it is evident that the recovery kernel required for restoring a diffraction-limited image is simply the reciprocal of the GOTF, or in other words $1/GOTF(u',v')$.

As mentioned above, the GOTF can be found when the transverse ray aberration in a given image plane is known. Therefore, a heavily blurred image with approximately constant blur can be converted back into its diffraction-limited counterpart when the GOTF of the optics is known, and then used as a recovery kernel in the process of inverse filtering.

Referring again to the specific embodiment shown in FIG. 1, one goal is to recover a diffraction-limited image of the object 26 in both of its positions 27 and 56, as if the optics were free from longitudinal chromatism. In such a case, the inverse filtering process in geometric optics approximation will call for use of the following recovery gain function:

$$2/\{\sin c(\nu z) + \sin c[\nu(z+dz)]\} = 2. \tag{8}$$

The decoded sharp, diffraction-limited image of the object will be the same for both positions of the object. The longitudinal chromatic aberration that must be provided by the optics is:

$$dz' = 2p\,N\,dz = -(s')2\,K/V, \tag{9}$$

where V is a relevant Abbe number for either refractive, diffractive or hybrid optics (represented here for simplicity by a set of thin lenses in contact), and where the corresponding optical power $K=1/(EFL)$, EFL being the effective focal length of the optics module. For total available chromatic dispersion, as represented by V, there will be a minimum back-working conjugate s' that will deliver the minimum required longitudinal chromatism. For imaging remote objects, this will be the minimum value $EFL_{min} = 2p\,N\,V$.

This requirement for a minimum image conjugate will also set the maximum possible field of view in object space (for given dimensions of the detector array). Depending on the amount of longitudinal chromatism, there can be complete overlap (dz=0, representing a reference scenario of perfect optics with no longitudinal chromatism), partial overlap (for object processing in all intermediate positions with approximately constant through-focus OTF response), or no overlap (processing only two discrete positions of the object).

For convenience and simplicity, the foregoing discussion of FIG. 1 has assumed that the object 26 emits, reflects or transmits only two wavelengths ($\lambda_1$ and $\lambda_2$) As a practical matter of course, the object 26 will typically emit, reflect, or transmit more than just two wavelengths. Therefore, assume for the sake of discussion that the object 26 in FIG. 1 emits, reflects or transmits more than two different discrete wavelengths, and that the intentional longitudinal chromatism of the optics 12 produces multiple, discrete, equidistant focal points of equal intensity along the optical axis 13, each such focal point corresponding to a respective different wavelength.

For each added wavelength, or in other words for each new equidistant focal point, a new incremental amount of longitudinal chromatism is needed, and thus more blur will be seen in the resulting image. In the two-wavelength case, the normalized chromatic focal shift step dz must be no smaller than 1 for the Nyquist condition to be met, but at the same time should be less than 2 in order to provide proper overlap of consecutive monochromatic OTFs. Consequently, the resulting polychromatic through-focus OTF response will have only small variations over the extended depth of focus. The optimal choice of the step depends on the number M of discrete wavelengths (spectral lines) involved.

Figure 2:
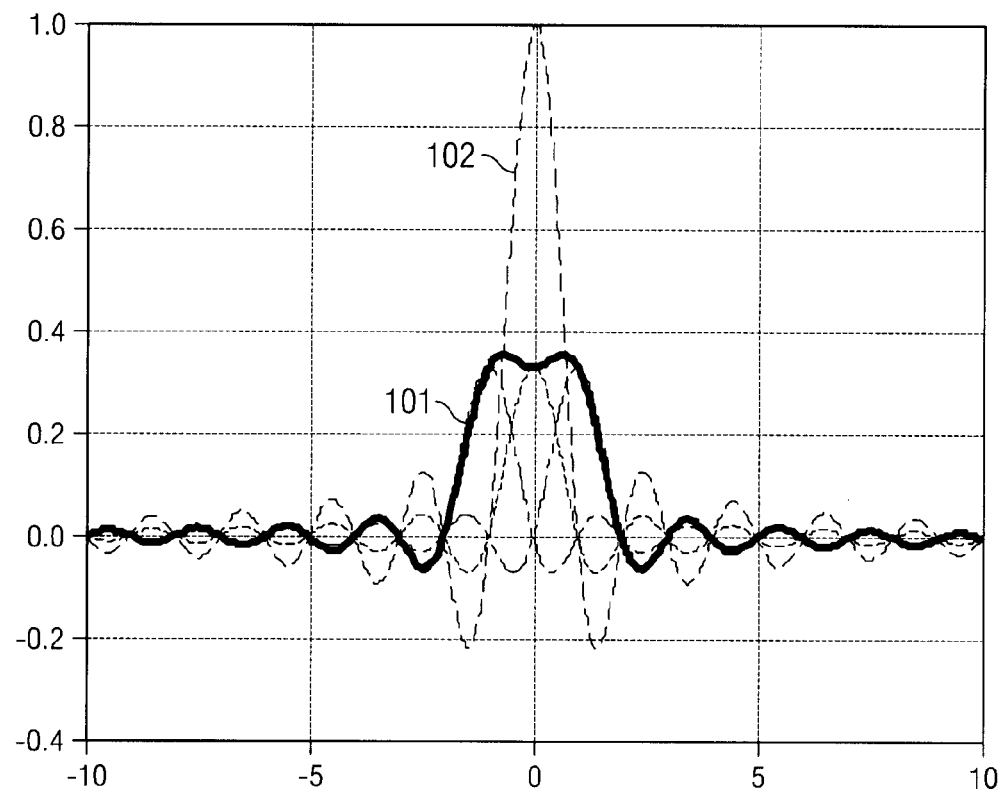
FIG. 2 is a graph showing, for the apparatus of FIG. 1, the through-focus monochromatic relative optical transfer functions (ROTFs) for each of three different wavelengths, a corresponding polychromatic ROTF, and a diffraction-limited response.

Assume that the object 26 emits, reflects or transmits three different wavelengths instead of just two different wavelengths. FIG. 2 is a graph showing the through-focus monochromatic relative OTFs (ROTFs) for each of the three wavelengths at the Nyquist frequency (with the monochromatic focii separated by the axial step dz=1.0), and also shows the resulting polychromatic ROTF 101, and the diffraction-limited response 102 (representing no longitudinal chromatism).

Figure 3:
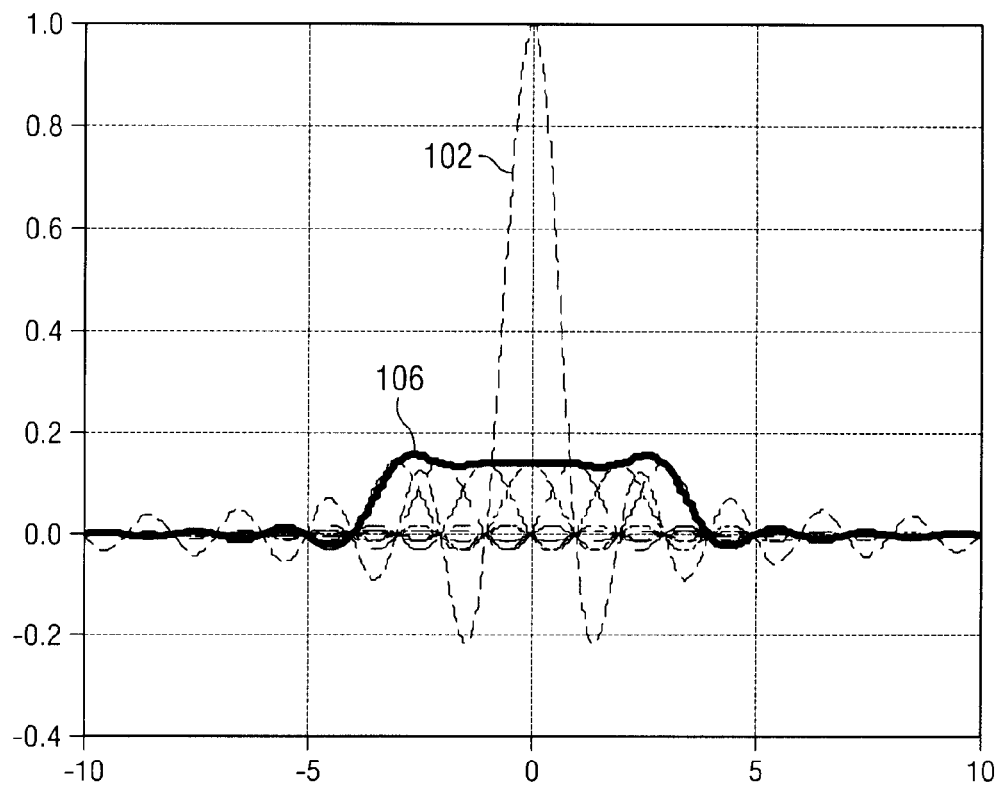
FIG. 3 is a graph showing, for the apparatus of FIG. 1, the through-focus monochromatic ROTFs for each of seven different wavelengths, a corresponding polychromatic ROTF, and a diffraction-limited response.

Now assume that the object 26 emits, reflects or transmits seven different wavelengths instead of just two or three different wavelengths. FIG. 3 is a graph showing the seven through-focus monochromatic relative OTFs (ROTFs) at the Nyquist frequency (with the monochromatic focii separated by the axial step dz=1.0), and also shows the resulting polychromatic ROTF 106, and the diffraction-limited response 102 (representing no longitudinal chromatism). As progressively more equidistant focal points are added, the expanded depth of focus becomes progressively larger, and the recovery gain needed to recover a sharp image also becomes progressively larger. For M spectral lines of equal strength, the spectral weights will all be the same and will all equal 1/M. At the same time, the depth of focus will be extended approximately M times, and the required recovery gain factor for achieving a diffraction-limited image will be M.

Figure 4:
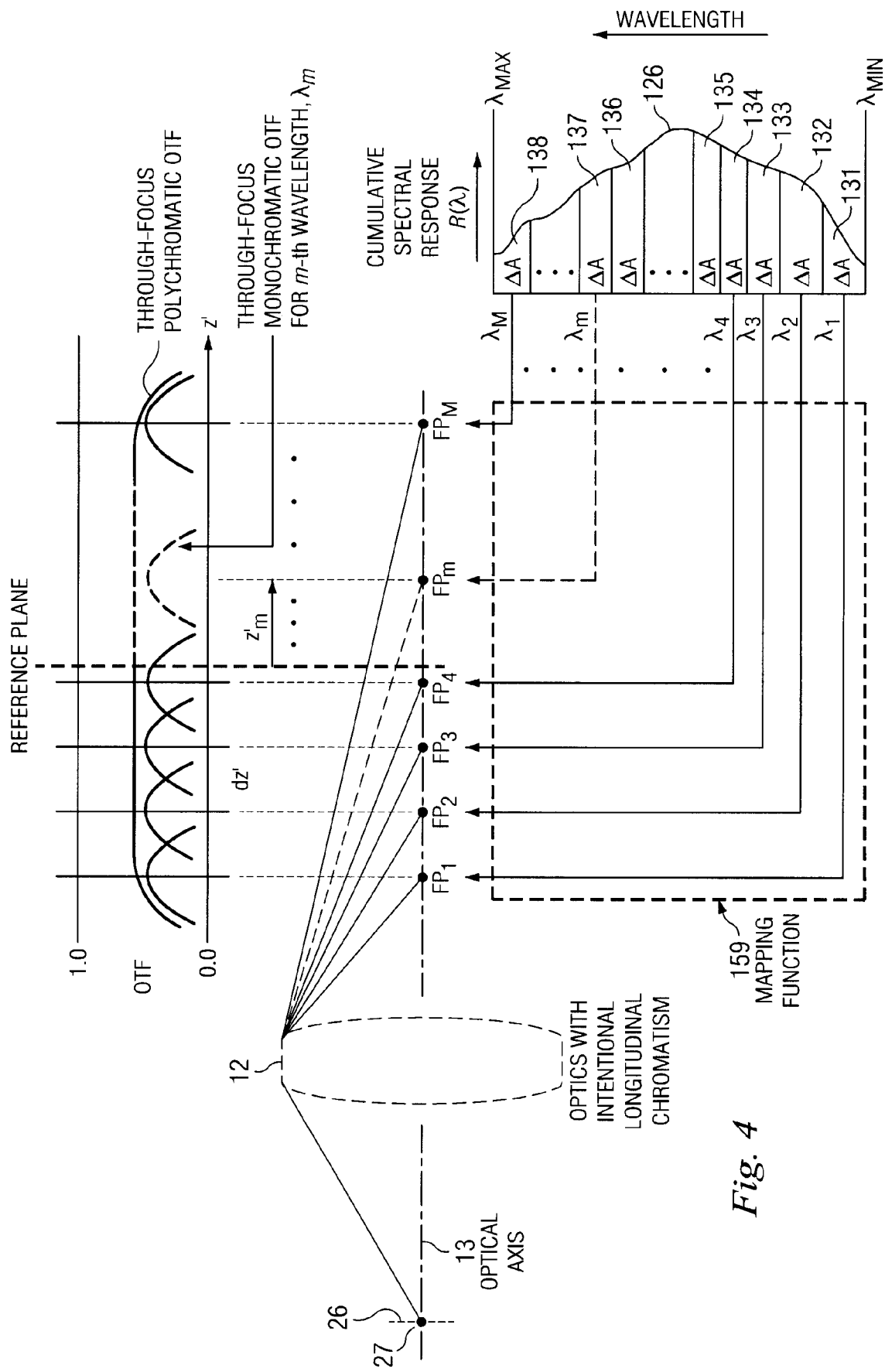
FIG. 4 is a diagrammatic view showing the optics of FIG. 1, and showing how intentional longitudinal chromatism of the optics is matched to a continuous broadband, non-uniform, spectral response of the overall system.

As a practical matter, of course, the object 26 of FIG. 1 will probably not emit, reflect or transmit just two, three or seven specific wavelengths. Instead, it will emit, reflect or transmit a relatively continuous spectrum of radiation. FIG. 4 is a diagrammatic view showing the object 26 and the optics 12 of FIG. 1, and showing how the intentional longitudinal chromatism of the optics 12 is matched to a continuous broadband, non-uniform, spectral response of the overall system.

In this regard, let $R(\lambda)$ represent the cumulative spectral response of the overall arrangement shown in FIG. 1, which is a product of (1) the spectral signature of the object 26, (2) the spectral response of the image detector 14, and (3) the spectral transmission through all media (including the atmosphere, any optical refractive and reflective materials, any diffractive structures, any thin-film coatings, and so forth). The lower right portion of FIG. 4 depicts a graph with a curve 126 representing this cumulative spectral response $R(\lambda)$ for the range from $\lambda_{min}$ to $\lambda_{max}$. Assume that, in the range from $\lambda_{min}$ to $\lambda_{max}$, the total area under the $R(\lambda)$ cumulative response curve 126 is A. Conceptually split this area A under the $R(\lambda)$ curve 126 into M segments of equal area $\Delta A = A/M$. In FIG. 4, eight of the M segments are identified with reference numerals 131-138.

In the first segment 131, select a first wavelength $\lambda_1$ that splits the first segment into two sub-segments of equal area $\Delta A/2 = A/2M$. Do the same for each of the other segments from 132 through 138, in order to obtain respective wavelengths $\lambda_2$ to $\lambda_M$ that each split the associated segment into two sub-segments of equal area $\Delta A/2 = A/2M$. These segment-splitting wavelengths $\lambda_1$ to $\lambda_M$ are referred to herein as wavelength nodes. The approach just described is one possible technique for selecting the wavelength nodes $\lambda_1$ to $\lambda_M$. Alternatively, however, it would be possible to select wavelength nodes using some other suitable technique. As one example, the wavelength node could be defined to be the abscissa of the center of gravity of the corresponding segment.

Still referring to FIG. 4, it will be noted that, between the wavelength nodes $\lambda_1$ and $\lambda_2$, there are two sub-segments that each have an area $\Delta A/2 = A/2M$. Thus, the area under the curve 126 between the two wavelength nodes $\lambda_1$ and $\lambda_2$ is $\Delta A = A/M$. Generalizing, the area under the curve 126 between each pair of adjacent wavelength nodes $\lambda_1$ to $\lambda_M$ in FIG. 4 is the same, and is $\Delta A = A/M$. As a corollary of this, it should be noted that, along the wavelength scale, there is non-uniform spacing between adjacent wavelength nodes $\lambda_1$ to $\lambda_M$. Of course, if the cumulative spectral response $R(\lambda)$ happened to be relatively constant over the entire spectral band min to max, then the wavelength nodes will be equally spaced. But in actual practice, the cumulative spectral response R(λ) will typically be non-uniform, and thus the wavelength nodes will typically be non-uniformly spaced.

Since each of the wavelength nodes $\lambda_1$ to $\lambda_M$ is associated with a respective segment 131-138 having an area ΔA=A/M, the spectral weight for each of the M corresponding spectral lines is the same, and is 1/M. In this manner, the case of a broadband spectral response is conveniently reformulated as a set of M discrete spectral lines of equal strength. In general, this yields a set of non-equidistant wavelength nodes $\lambda_1$ to $\lambda_M$ that, with reference to FIG. 4, will be mapped into a set of focal points $FP_1$ through $FP_M$ that are equally spaced along the optical axis 13, where each of the focal points $FP_1$ through $FP_M$ corresponds directly to a respective one of the wavelength nodes $\lambda_1$ to $\lambda_M$. In FIG. 4, the mapping function is represented diagrammatically by a broken-line box at 159.

The mapping of non-equidistant wavelength nodes $\lambda_1$ to $\lambda_M$ into equidistant focal points $FP_1$ through $FP_M$ can be achieved with optics 12 that provide appropriate longitudinal chromatism (chromatic focal shift). On an analytical level, for purely refractive optics, it would be possible to represent the required chromatic focal shift by a low-order polynomial of wavelength λ (or its reciprocal 1/λ for diffractives). On the other hand, for engineering work, a more practical approach is to set the required equidistant chromatic focal shift values (for the non-equidistant spectral lines having the same strength) as targets in a merit function (also known as an error function), while optimizing the optics with the help of a commercially-available lens-design computer program. In this regard, examples of suitable lens-design computer programs include the program available under the tradename CODE V from Optical Research Associates of Pasadena, Calif., the program available under the trademark ZEMAX® from Zemax Development Corporation of Bellevue, Wash., or the program available under the tradename OSLO from Sinclair Optics, Inc. of Pittsford, N.Y. These are merely examples, and it would alternatively be possible to use any other suitable lens-design computer program.

In regard to the mapping function shown diagrammatically at 159 in FIG. 4, one approach for implementing this mapping function is through the use of an error function. More specifically, one suitable error function is a sum of properly-weighted squares of individual defects. In particular, several defect values are calculated, where each defect value is the difference between a desired value and a calculated value for a particular parameter of interest. Each such defect value is then squared, and the squared values are then weighted according to their relative importance. Next, the weighted squares are summed.

When utilizing the ZEMAX® software mentioned above, the error function can be generated by using a series of "AXCL" operands. Each AXCL operand calculates a chromatic focal shift (the axial distance between two focal points that correspond to two different wavelengths). Thus, in the case of FIG. 4, the nodes for wavelengths $\lambda_1$ and $\lambda_2$ are used to calculate AXCL(1,2), the nodes for wavelengths $\lambda_2$ an $\lambda_3$ are used to calculate AXCL(2,3), the nodes for wavelengths $\lambda_3$ an $\lambda_4$ are used to calculate AXCL(3,4), and so forth. These AXCL operands do the mapping from adjacent wavelength nodes into axial distances between corresponding adjacent focal points.

The ZEMAX® software is then asked to re-optimize an initial lens configuration in a manner so that all of these AXCLs will be equal. It is advisable to simply ask for a configuration in which all AXCLs are equal, without specifying a particular value to which they must converge, so that the optimization process can take advantage of this additional degree of freedom. Technically, only the differences between successive AXCLs need be entered as defects into ZEMAX® in order to define the error function. The ZEMAX® software has an "EQUA" operand that can then be used over the series of AXCL operands to specify that they should all be equal in the resulting lens configuration. The optimization algorithm in ZEMAX® then takes the initial lens configuration, and iteratively adjusts parameters of that configuration (such as lens radius of curvature, lens thickness, air gap between lenses, and so forth), in an effort to progressively decrease the error function, until the error function (the sum of weighted squares) is below a selected threshold value.

The ZEMAX® software is designed to normally combine this custom error function (sum of weighted squares) with a default error function. One characteristic of the default error function is that it is designed to try to remove longitudinal chromatism (which is normally considered undesirable). However, when carrying out the optimization disclosed herein, the default error function should be disabled (or at least reduced to its monochromatic part at the center wavelength). This ensures that the default error function will not be working against the custom error function. In other words, it ensures that the default error function is not attempting to remove the longitudinal chromatism that the custom error function is seeking to intentionally establish.

An example will now be provided of one technique for configuring optics 12 that have intentional longitudinal chromatism appropriate for a specific scene or object 26. As discussed above, the apparatus 10 of FIG. 1 could be configured for use in any of a variety of different portions of the electromagnetic spectrum, but happens to be configured for use with LWIR radiation (wavelengths of about 8-12 μm). The following discussion is thus set in the context of the LWIR portion of the spectrum, but the disclosed approach is equally applicable to other portions of the electromagnetic spectrum.

Figure 5:
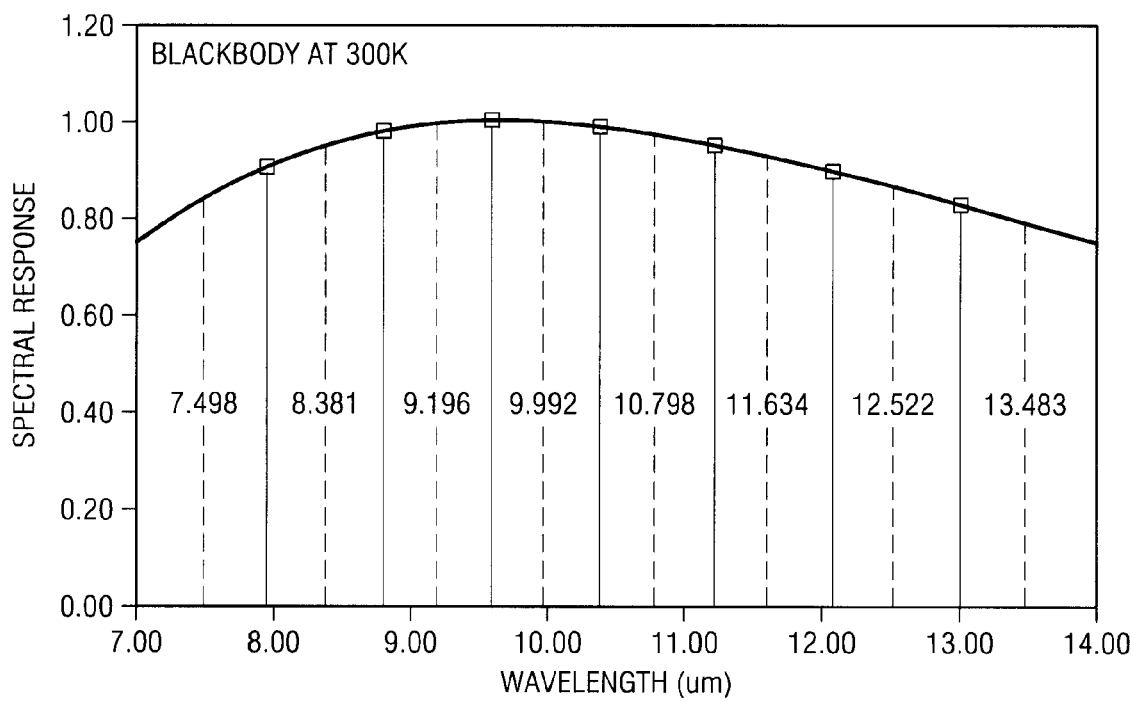
FIGS. 5, 6 and 7 show, for a hypothetical scene or object, different blackbody spectral curves corresponding to respective different temperatures of 300K, 350K, and 400K, where the curves have been normalized on the basis of their peak values.
Figure 6:
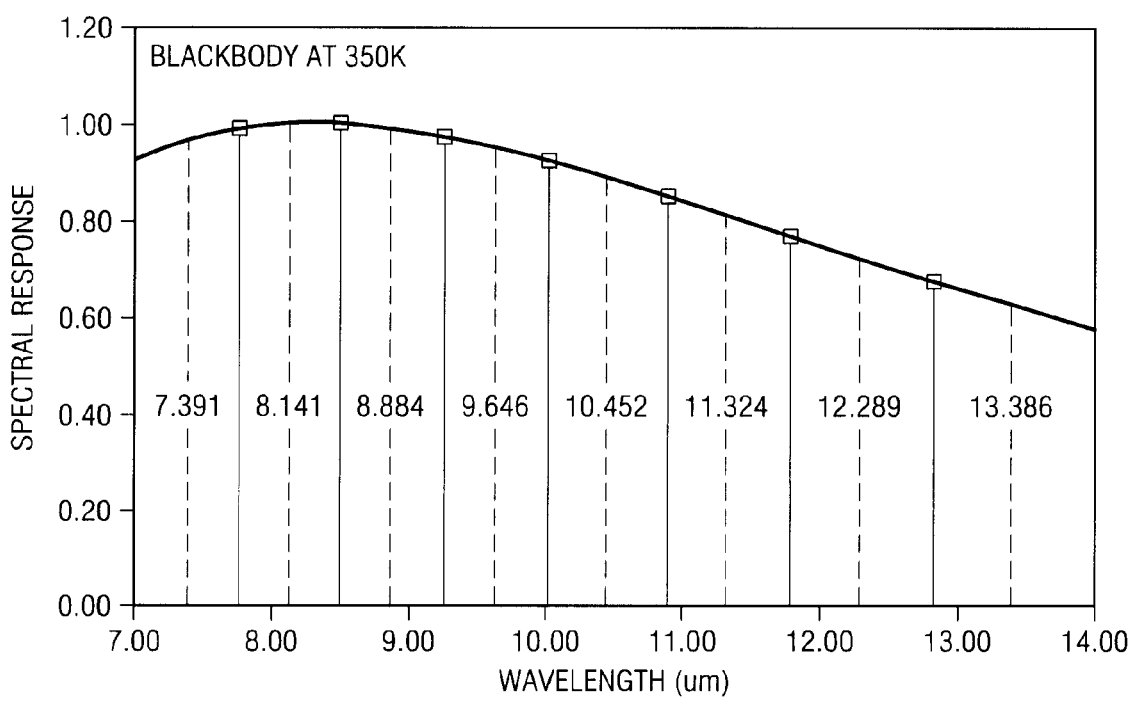
Figure 7:
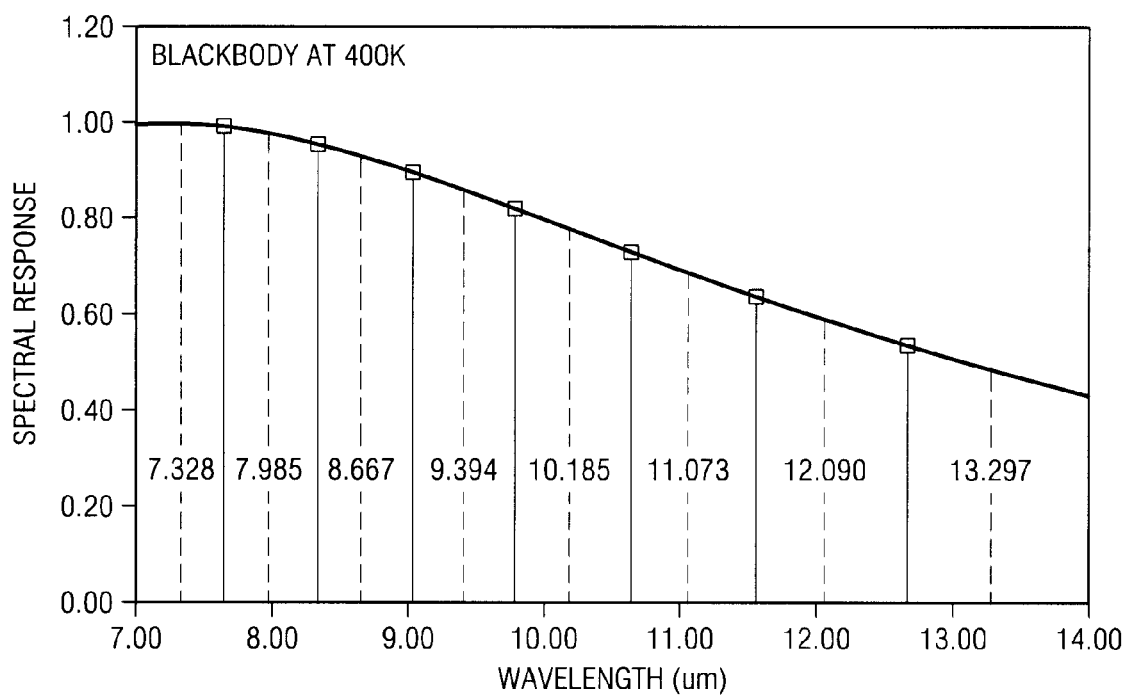

For the purpose of this discussion, it is assumed that the target or object 26 of interest has temperatures in the range of about 300K to 400K. For example, healthy human targets typically emit radiation at about 310K (37° C.), regardless of race, age or gender. FIGS. 5, 6 and 7 each show a blackbody spectral curve corresponding to a respective different temperature, over the range of 7-14 μm. More specifically, the curve in FIG. 5 corresponds to a temperature of 300K, the curve in FIG. 6 corresponds to a temperature of 350K, and the curve in FIG. 7 corresponds to a temperature of 400K. These curves have been normalized, based on their peak values.

In each of FIGS. 5-7, the area under the curve has been divided into 8 segments of equal area, where these segments are separated by the solid vertical lines. Then, each of these 8 segments has been split into two sub-segments of equal area, as indicated by the broken vertical lines. The wavelengths corresponding to the vertical broken lines are referred to herein as wavelength nodes. It will be noted that, between any two adjacent vertical broken lines, the area under the curve is the same, and equals the area under the curve between any two adjacent vertical solid lines.

As explained earlier, the image detector 14 (FIG. 1) is an uncooled microbolometric array having 19,200 pixels (160× 120 pixels), and having a pixel pitch of 45 microns. Thus, the sampling frequency is 22 cycles/mm, and the Nyquist frequency is 11 cycles/mm. As known in the art, uncooled arrays of this type require very fast optics, for example on the order of f/1. It is assumed that the spectral transmission of the atmosphere and the optics 12, together with the spectral response of the image detector 14, define an ideal "top-hat" spectral curve. As a result, the total cumulative spectral response R(λ) of the entire system will be proportional to the blackbody spectral curve representing a given thermal scene or object. Consequently, the wavelength nodes shown in FIGS. 5-7 effectively represent the entire system.

Figure 8:
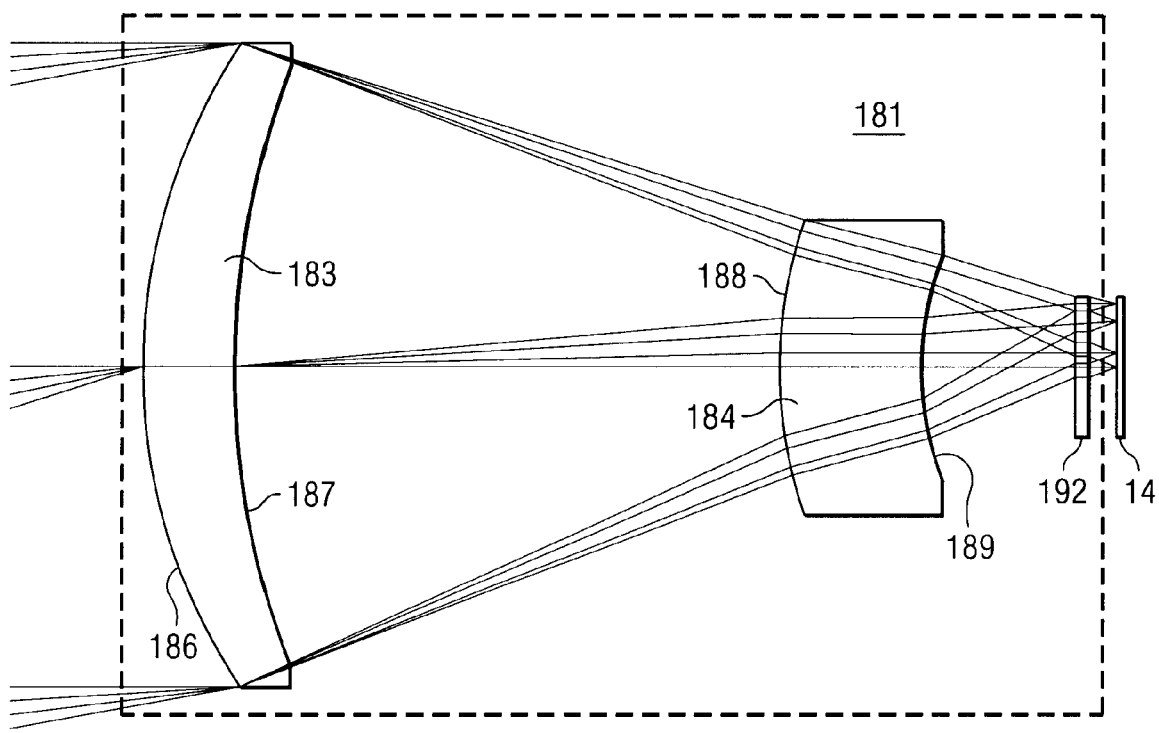
FIG. 8 is a diagrammatic view of conventional optics that have been used with an image detector of the type shown in FIG. 1.

As mentioned above, the image detector 14 requires very fast optics 12. FIG. 8 is a diagrammatic view of pre-existing optics 181 that have been used with an image detector of the type shown at 14. The optics 181 include two separate, spaced lenses 183 and 184. The lens 183 has a front surface 186 and a rear surface 187, and the lens 184 has a front surface 188 and a rear surface 189. A protective housing for the image detector 14 includes a protective window 192 that has no optical power. The optics 181 have a focal length of 60 millimeters, and a f-number of f/1.15. The lenses 183 and 184 are each made of a chalcogenide glass, because chalcogenide glass transmits LWIR radiation. To provide a reasonable field of view (FOV) in optics this fast, while maintaining a low lens count, the rear surfaces 187 and 189 are each aspheric.

In order to correct longitudinal chromatism while maintaining the low lens count, the rear surface 187 of the lens 183 is a concentric diffractive optical surface (DOS), which is provided on the aspheric base nearest the stop (or pupil) of the lens. The DOS can be formed at relatively low cost on the aspheric base, using diamond turning. In this prior art arrangement of FIG. 8, the DOS at 187 is specifically designed to correct longitudinal chromatism. In contrast, as discussed above, the optics 12 in FIG. 1 introduce intentional longitudinal chromatism in a particular manner. The prior art optics shown at 181 in FIG. 8 are used as a starting point, and are modified so as to obtain the optics 12 (FIG. 1) that not only intentionally introduce longitudinal chromatism, but do so in a manner providing even distribution along the optical axis of the longitudinal chromatism for unequally-spaced wavelength nodes (FIGS. 5-7).

Figure 9:
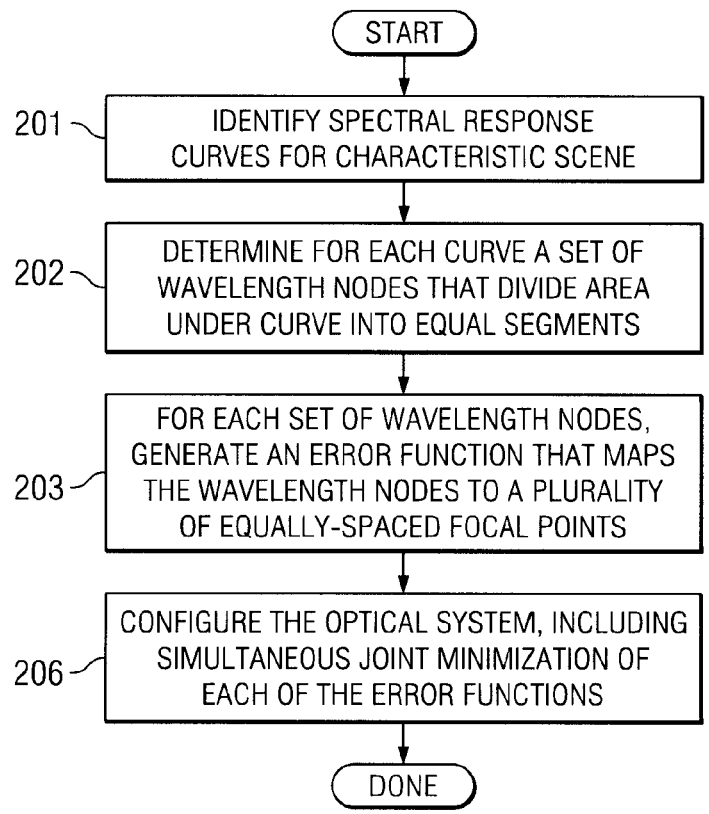
FIG. 9 is a flowchart showing a procedure for configuring optics to distribute evenly along an optical axis the longitudinal chromatism for unequally-spaced wavelength nodes.

FIG. 9 is a flowchart showing one possible procedure for configuring optics that have appropriate intentional longitudinal chromatism, in particular where the optics distribute evenly along the optical axis the longitudinal chromatism for unequally-spaced wavelength nodes. In block 201, one or more spectral response curves are identified for a characteristic scene or object. In the example under discussion here, these are the spectral response curves shown in FIGS. 5-7. Then, in block 202, a respective set of wavelengths nodes are identified for each curve, where the wavelike nodes divide the area under the spectral response curve into equal segments. In each of FIGS. 5-7, the wavelength nodes are the wavelengths corresponding to the vertical broken lines.

Next, in block 203, an error function or mapping relationship is generated for each set of wavelength node. The error function maps the wavelength nodes of that set to a plurality of focal points that are spaced equally along the optical axis. One such error or mapping function is indicated diagrammatically at 159 in FIG. 4.

Then, in block 206, the optics 12 are configured in a manner that includes simultaneous joint minimization of each of the error functions. In the specific example discussed here, this was carried out using a damped least squares algorithm that is an integral part of the standard ZEMAX® lens design software. However, it would alternatively be possible to use different lens-design software, and/or a different automatic optimization algorithm.

Figure 10:
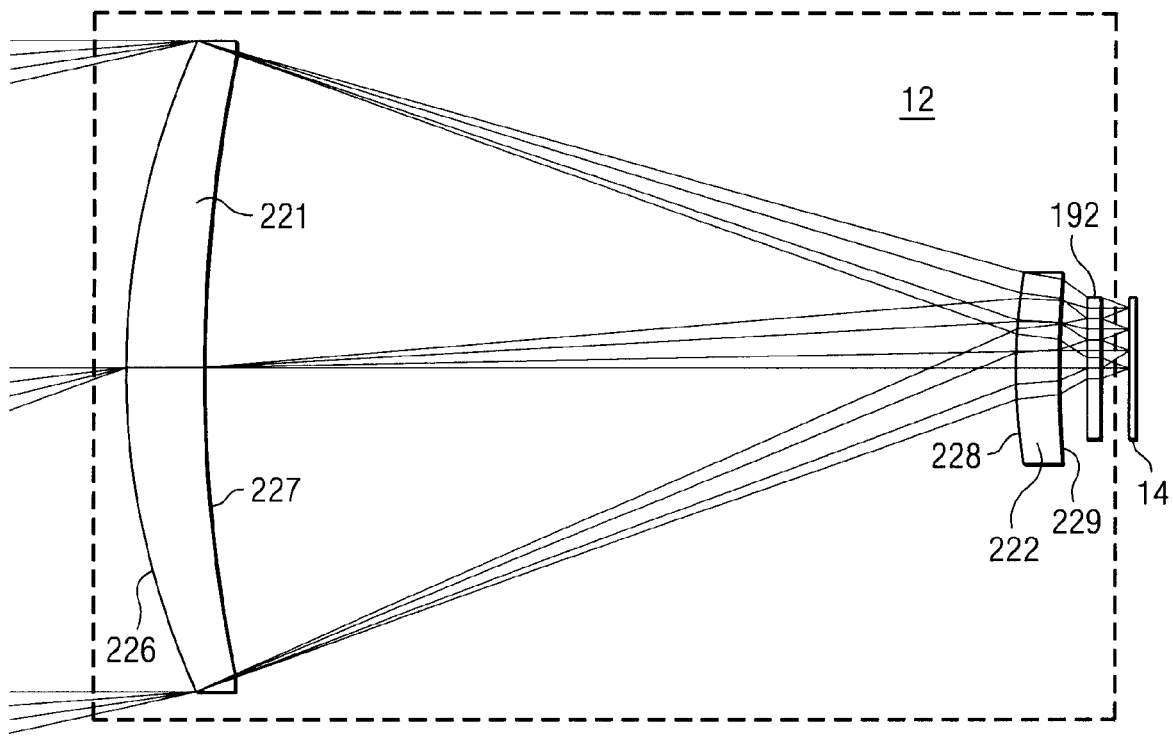
FIG. 10 is a diagrammatic view of exemplary optics obtained using the procedure of FIG. 9, which are also the optics in FIG. 1.
Figure 11:
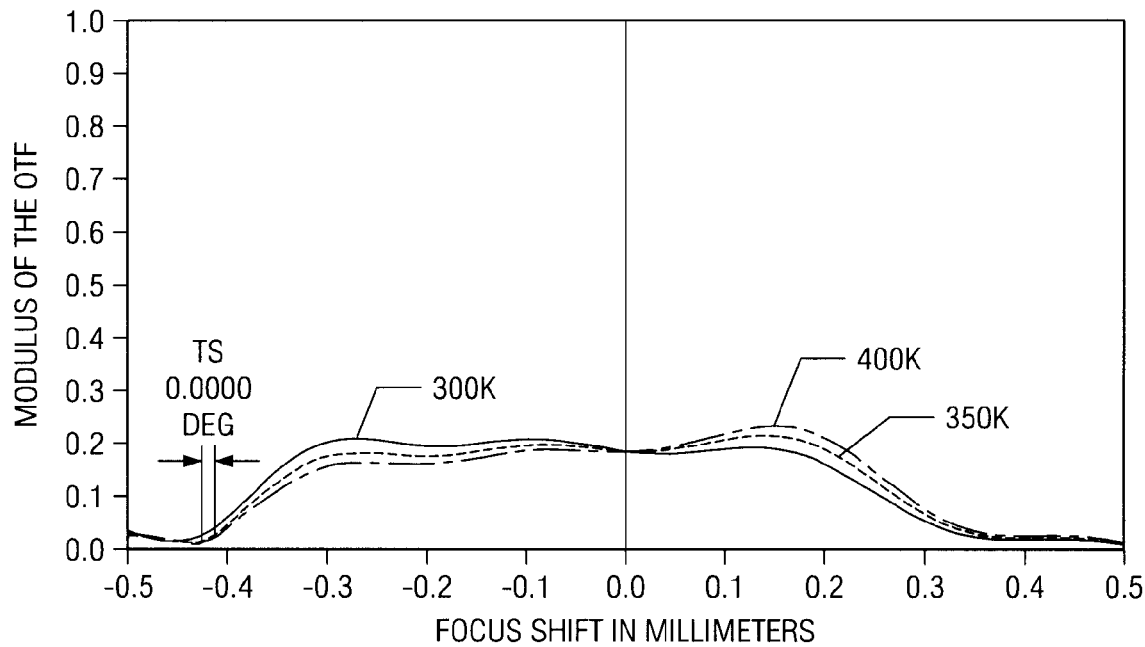
FIG. 11 is a graph showing the axial geometric optical transfer function performance achieved with the apparatus of FIG. 1 embodying the optics of FIG. 10.

FIG. 10 is a diagrammatic view of the resulting optics 12 that are used in the apparatus 10 of FIG. 1, and that embody aspects of the invention. The image detector 14 is still present, with its zero-power window 192. The optics 12 include two lenses 221 and 222. The lens 221 is made of chalcogenide glass, and the lens 222 is made of germanium. The optics 12 have a focal length of 57.5 millimeters, and a f-number of f/1.10. The lens 221 has a front surface 226 and a rear surface 227, and the lens 222 has a front surface 228 and a rear surface 229. The surface 229 is aspheric. The surface 227 is a DOS on an aspheric base, the DOS including 28 concentric rings. The DOS contributes only to optical power, or in other words has no higher-order terms, and provides the desired degree of intentional longitudinal chromatism. FIG. 11 is a graph showing the axial GOTF performance achieved with the apparatus 10 (FIGS. 1 and 10). FIG. 11 shows that, as the temperature of the blackbody object varies from 300K to 400K, there are minimal changes across an extended depth of focus.

In order to provide a comparative demonstration of the fact that the depth of field can be increased, an experiment was carried out. The experiment used a single conventional infrared camera designed to record images of radiation in the 8-12 μm thermal band (LWIR). The camera included an uncooled infrared detector with 76,800 pixels (320×240 pixels), and a pixel pitch of 45 μm. The camera included a conventional, well-corrected f/1.1 lens arrangement with two aspheric chalcogenide lenses, and having an effective focal length of 60 mm. To facilitate a comparative evaluation, a separate and additional diffractive element was fabricated, with a configuration designed to add the appropriate degree and distribution of intentional longitudinal chromatism. The diffractive element could be selectively removably mounted to the front of the conventional camera, so that the camera could be used either with or without the diffractive element. This removable diffractive element had 7 rings, zero total diffractive-refractive optical power, and rotational symmetry. It was designed using the procedure described above, for a blackbody source at 300K. The final optimization was performed using ZEMAX® lens design software, in the manner described above. The ZEMAX® software was also utilized to generate a corresponding kernel for deconvolving blurred images.

The camera was focused on a selected location that was spaced from the camera by 150 cm to infinity, depending on the experiment. Various experimental scenes were provided, with objects disposed in an extended field of view relative to the selected location at which the camera was focused. For each experimental scene, images were taken with the removable diffractive element in place (i.e. intentionally chromatically blurred images), and also without the diffractive element (i.e. conventional images). Information from the blurred images was deconvolved using the 1/GOTF kernel, in order to obtain processed versions of those images. Comparisons looked at signal-to-noise ratio (SNR), sharpness, and object recognition. The processed images were sharp images having a depth of field greater than that of the conventional images.

Figure 12:
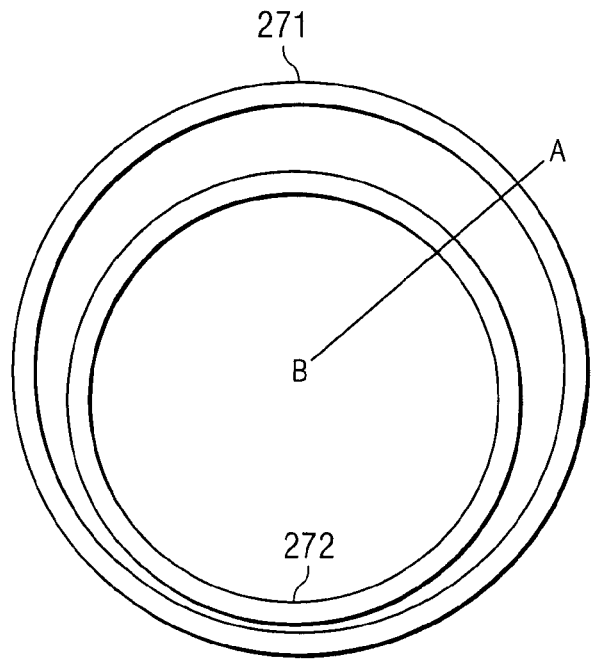
FIG. 12 is a diagrammatic view of an experimental scene having a heat source behind an object with two rings.
Figure 13:
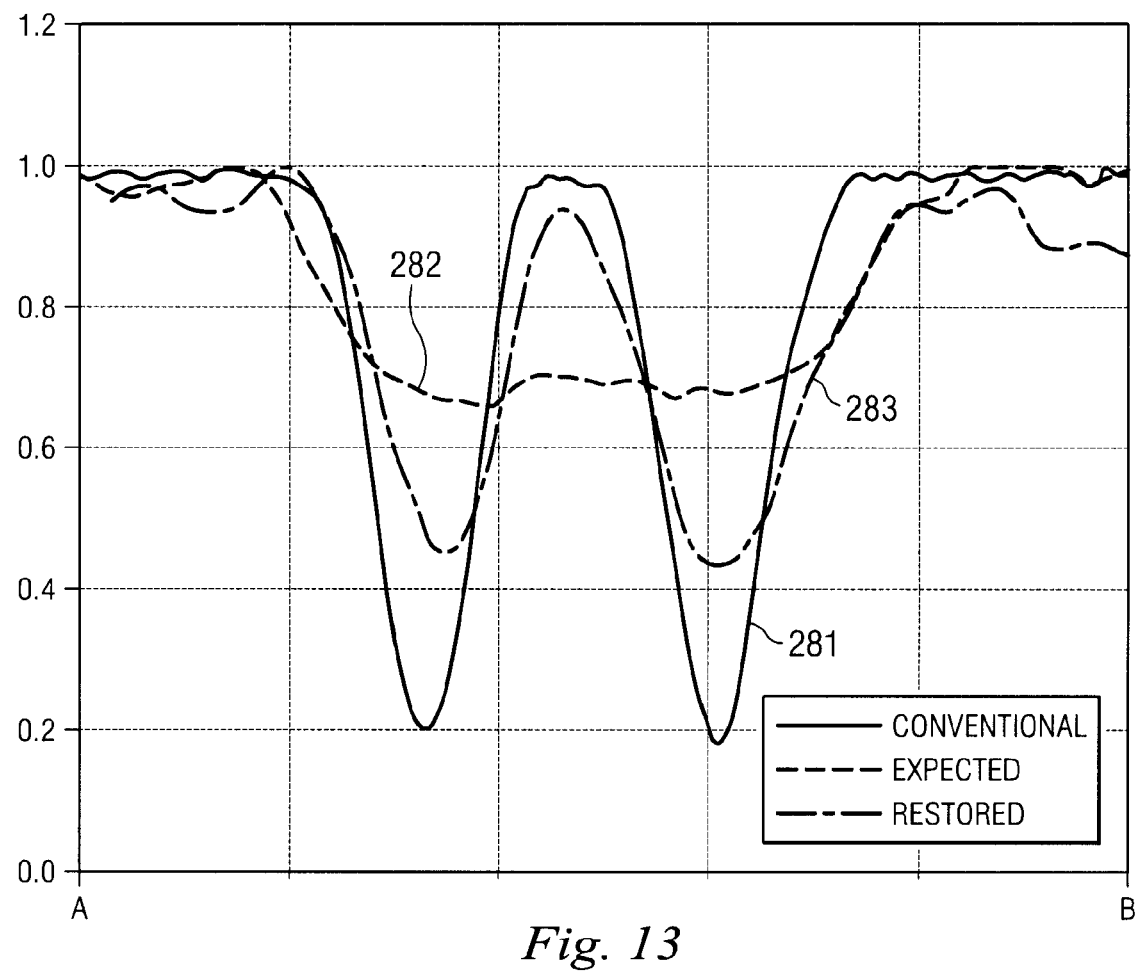
FIG. 13 is a graph showing three curves representing intensity distribution along a line A-B in the scene of FIG. 12.

As one example, FIG. 12 is a diagrammatic view of an experimental scene having a heat source behind an object with two rings 271 and 272. These rings 271 and 272 were spaced from the camera by a distance approximately 5 times farther than the conventional depth of field. As explained above, similar images of this scene were taken with and also without the removable diffractive element. As to the images taken with the removable diffractive element, information from the images was deconvolved using the above-discussed kernel, in order to obtain processed images. FIG. 13 is a graph showing (1) a curve 281 representing the expected intensity distribution along line A-B in FIG. 12, (2) a curve 282 representing the intensity distribution along line A-B from a conventional image taken without the removable diffractive element, and (3) a curve 283 representing the intensity distribution along line A-B from a processed image obtained through deconvolution of information from an intentionally-blurred image taken with the diffractive element. The curve 281 representing the expected intensity distribution was an approximation based on a separate reference image taken without the diffractive element, with the two-ring object disposed at a location within the normal focus limit of the camera. In FIG. 13, it will be noted from the curve 282 for the conventional image that the two rings are so blurred the intensity distribution is relatively uniform in the region of the rings. As a result, it is difficult to clearly identify either ring, or the separation between the rings. In contrast, the curve 283 from the processed image rather distinctly identifies each of the two rings, and the separation between them.

As evident from the foregoing discussion of some selected embodiments, the technique disclosed herein can be used in task-based optical-digital systems that are suitable for imaging scenes or objects having spectral characteristics that do not change dramatically in time and/or space. It assumes at least partial knowledge of the spectral signature of such scenes or objects. Some examples of such task-based systems are thermal imagers, optical imagers for X-ray scintillators, and fluorescent microscopes.

One aspect of the disclosed technique is the provision of an extended depth of focus (extended depth of field) through use of deconvolution (or a similar decoding or recovery operation) on a purposefully-blurred image generated by an optical system having a predetermined distribution of longitudinal chromatism along an optical axis. This predetermined distribution ensures a proper match to the cumulative spectral response of the entire system, including the spectral signature of the scene or object, the spectral transmission of the media (atmosphere), the spectral transmission of the imaging optics, and the spectral response of the image detector (or other structure for recording images).

One relevant consideration is that a given cumulative spectral response function of a system can be mapped into a corresponding, axially-constant polychromatic imaging response (such as an OTF or PSF) through the use of appropriate predetermined longitudinal chromatism of the optics. In other words, given the spectral signature of a scene or object, and known spectral characteristic of the system, a curve that represents variation of chromatic focal shift relative to wavelength can be shaped in such a way that polychromatic blur along the optical axis will be constant over a region of extended depth. If this condition is even approximately satisfied, any standard deconvolution technique can be used (with a unique recovery kernel) to decode a blurred image in a single operation, and a corresponding sharp image over the extended depth of field will be obtained. Exotic and expensive optical hardware is unnecessary. Thus, for example, it is unnecessary to use phase masks, or hardware that carries out spectral splitting of radiation into a number of independent spectral (color) channels that are processed separately.

For spectral signatures of a graybody taken at substantially different temperatures, it is possible to obtain approximately constant blur with axial chromatism of the optics. This is significant, because many common sources of heat in thermal infrared (including humans, animals, sky, sand, engines, and so forth) can be characterized by a well-known graybody model. Through use of the technique disclosed herein, it becomes practical to provide a new generation of IR thermal imaging devices having an extended depth of field.

The disclosed technique will work where a scene or object emits, reflects or transmits radiation having at least two distinct spectral lines (two distinct wavelengths). Strictly speaking, the disclosed technique cannot be used for monochromatic radiation composed of a single spectral line (a single wavelength). But in the real world, purely monochromatic radiation does not exist, and only quasi-monochromatic radiation can be observed. And if quasi-monochromatic radiation has a spectral bandwidth that is large enough for highly dispersive optics to create total chromatic focal shift, the disclosed technique can be successfully used. Of course, better results are achieved where the radiation received from a scene or object is broadband radiation composed of many discrete spectral lines, or having a continuous broadband spectral distribution.

Although the approach disclosed above achieves image deblurring through inverse filtering with the use of a geometric optics-based recovery kernel, it would alternatively be possible to use any of a number of other deconvolution techniques, including both traditional linear and constrained nonlinear techniques. Some examples include pseudoinverse filtering, Wiener filtering, Van Cittert's technique, and a maximum entropy technique. In some cases, satisfactory deblurring can be achieved without deconvolution, for example through use of a simple image enhancement tool, such as an edge sharpness filter. Such techniques may be preferred if deblurred image resolution can be traded off for a better signal-to-noise ratio.

Although selected embodiments have been illustrated and described in detail, it should be understood that a variety of substitutions and alterations are possible without departing from the spirit and scope of the present invention, as defined by the claims that follow.

What is claimed is:

1. An apparatus comprising optics that direct radiation from a scene along an optical axis, said optics having a longitudinal chromatic dispersion that is a function of a characteristic spectral signature for the scene, the characteristic spectral signature including a plurality of discrete wavelengths corresponding to a substantially same response, the optics being configured to focus each of the plurality of discrete wavelengths to a different focal point, the focal points being substantially equally spaced along the optical axis, so as to produce a polychromatic blur that, for an extended depth-of-field region, is substantially spatially constant along said optical axis;

wherein said optics include a first lens having first and second optical surfaces on opposite sides thereof, and a second lens spaced from said first lens and having third and fourth optical surfaces on opposite sides thereof, one of said first, second, third and fourth optical surfaces being a diffractive optical surface with an aspheric base, and another of said first, second, third and fourth optical surfaces being aspheric.

2. An apparatus according to claim 1, including an image detector positioned in the path of radiation that has passed through said optics.

3. An apparatus according to claim 2, including structure that processes an output of said image detector to produce a sharp image of the scene that includes said extended depth-of-field region.

4. An apparatus according to claim 2, including structure that deconvolves an output of said image detector to produce a sharp image of the scene that includes said extended depth-of-field region.

5. An apparatus according to claim 1, wherein radiation from the scene passes successively through said first, second, third and fourth optical surfaces, said second optical surface being said diffractive optical surface with an aspheric base, and said fourth optical surface being said aspheric surface.

6. The apparatus of claim 1, wherein the substantially same response corresponds to a substantially same optical transfer function (OTF).

7. A method comprising using optics to direct radiation from a scene along an optical axis, said optics having a longitudinal chromatic dispersion that is a function of a characteristic spectral signature for the scene, the characteristic spectral signature including a plurality of discrete wavelengths corresponding to a substantially same response, the optics being configured to focus each of the plurality of discrete wavelengths to a different focal point, the focal points being substantially equally spaced along the optical axis, so as to produce a polychromatic blur that, for an extended depth-of-field region, is substantially spatially constant along said optical axis;

the method further comprising configuring said optics to include a first lens having first and second optical surfaces on opposite sides thereof, and a second lens spaced from said first lens and having third and fourth optical surfaces on opposite sides thereof, one of said first, second, third and fourth optical surfaces being a diffractive optical surface with an aspheric base, and another of said first, second, third and fourth optical surfaces being aspheric.

8. A method according to claim 7, including causing radiation that has passed through said optics to impinge onto an image detector.

9. A method according to claim 8, including processing an output of said image detector to produce a sharp image of the scene that includes said extended depth-of-field region.

10. A method according to claim 8, including deconvolving an output of said image detector to produce a sharp image of the scene that includes said extended depth-of-field region.

11. A method according to claim 7, wherein said configuring of said optics further includes:

arranging said first and second lenses so that radiation from the scene passes successively through said first, second, third and fourth optical surfaces;

selecting said second optical surface to he said diffractive optical surface with an aspheric base; and selecting said fourth optical surface to be said aspheric surface.

12. A method according to claim 7, wherein the characteristic spectral signature includes a response curve corresponding to a range of wavelengths, and wherein the plurality of discrete wavelengths corresponding to the substantially same response are selected from the range of wavelengths by dividing an area under the spectral response curve into a plurality of segments of substantially equal area.

13. A method according to claim 7, wherein the substantially same response corresponds to a substantially same optical transfer function (OTF).

14. An apparatus comprising optics that direct radiation from a scene along an optical axis, said optics having a longitudinal chromatic dispersion that is a function of a characteristic spectral signature for the scene, the characteristic spectral signature including a plurality of discrete wavelengths corresponding to a substantially same response, the optics being configured to focus each of the plurality of discrete wavelengths to a different focal point, the focal points being substantially equally spaced along the optical axis, so as to produce a polychromatic blur that, for an extended depth-of-field region, is substantially spatially constant along said optical axis;

wherein the characteristic spectral signature includes a response curve corresponding to a range of wavelengths, and wherein the plurality of discrete wavelengths corresponding to the substantially same response are selected from the range of wavelengths by dividing an area under the spectral response curve into a plurality of segments of substantially equal area.

15. An apparatus according to claim 14, including an image detector positioned in the path of radiation that has passed through said optics.

16. An apparatus according to claim 15, including structure that processes an output of said image detector to produce a sharp image of the scene that includes said extended depth-of-field region.

17. An apparatus according to claim 15, including structure that deconvolves an output of said image detector to produce a sharp image of the scene that includes said extended depth-of-field region.

18. An apparatus according to claim 14, wherein said optics include a first lens having first and second optical surfaces on opposite sides thereof, and a second lens spaced from said first lens and having third and fourth optical surfaces on opposite sides thereof, one of said first, second, third and fourth optical surfaces being a diffractive optical surface with an aspheric base, and another of said first, second, third and fourth optical surfaces being aspheric.

19. An apparatus according to claim 18, wherein radiation from the scene passes successively through said first, second, third and fourth optical surfaces, said second optical surface being said diffractive optical surface with an aspheric base, and said fourth optical surface being said aspheric surface.

20. An apparatus according to claim 14, wherein the substantially same response corresponds to a substantially same optical transfer function (OTF).

* * * * *